United States Patent [19]

Nakamura et al.

[11] 4,140,731

[45] Feb. 20, 1979

[54] RESIN COMPOSITIONS HAVING SUPERIOR MECHANICAL PROPERTIES

[75] Inventors: Junichi Nakamura; Takashi Ueshima; Shigeru Kurosawa, all of Yokohama, Japan

[73] Assignee: Showa Denko Kabushiki Kaisha, Tokyo, Japan

[21] Appl. No.: 824,775

[22] Filed: Aug. 15, 1977

[30] Foreign Application Priority Data

Aug. 13, 1976 [JP] Japan .................................. 51-96100

[51] Int. Cl.² ............................................. C08L 51/04
[52] U.S. Cl. ................................ 260/876 R; 260/4 R; 260/879
[58] Field of Search ..................... 260/876 R, 879, 4 R

[56] References Cited

U.S. PATENT DOCUMENTS 4,021,510  5/1977  Ueshima et al. .................. 260/876 R

*Primary Examiner*—John C. Bleutge
*Attorney, Agent, or Firm*—Sughrue, Rothwell, Mion, Zinn and Macpeak

[57] ABSTRACT

A resin composition having superior mechanical properties, especially high impact strength, which comprises (A) a norbornene-type polymer obtained by ring-opening polymerization of 5-cyano-bicyclo[2,2,1]heptene-2 or a mixture thereof with a small amount of a cycloolefin-type compound in the presence of an unsaturated polymer having a carbon-carbon double bond in the molecule and (B) a vinyl chloride homopolymer or copolymer.

17 Claims, 2 Drawing Figures

RESIN COMPOSITIONS HAVING SUPERIOR MECHANICAL PROPERTIES

BACKGROUND OF THE INVENTION

1. Field of the Invention

This invention relates to a resin composition having superior mechanical properties. More specifically, the invention relates to a resin composition having superior mechanical properties which comprises (A) a polymer obtained by ring-opening polymerization of (1) 5-cyano-bicyclo[2,2,1]-heptene-2 or a mixture thereof with a small amount of a cycloolefin-type compound in the presence of (2) an unsaturated polymer containing a carbon-carbon double bond in the molecule (to be referred to hereinafter as an "unsaturated polymer"), and (B) a homopolymer of vinyl chloride and/or a copolymer composed mainly of vinyl chloride (to be referred to hereinafter as a vinyl chloride-type polymer).

2. Description of the Prior Art

Vinyl chloride-type polymers are widely manufactured commercially and have a wide range of applications. It is widely known, however, that when these vinyl chloride-type polymers are fabricated into molded articles, their impact strength is not entirely satisfactory.

In order to improve the impact strength of vinyl chloride-type polymers, frequently the practice is to employ a grafting method wherein a vinyl chloride monomer is graft-copolymerized with a relatively large amount of an unsaturated polymer, and a blending method wherein a vinyl chloride-type polymer is blended with an unsaturated polymer. Although these grafting and blending methods can be used to improve the impact strength of vinyl chloride-type polymers, it is also widely known that the mechanical properties such as tensile strength and hardness and the thermal properties such as heat resistance of the product are reduced.

On the other hand, less deterioration in mechanical properties other than impact strength and in heat resistance occurs with resin compositions obtained by blending vinyl chloride-type polymers with impact-resistant resins such as a terpolymer of acrylonitrile/butadiene/styrene (ABS resin) or a terpolymer of methyl methacrylate/butadiene/styrene (MBS resin) than with compositions obtained by blending unsaturated polymers with vinyl chloride-type polymers but such polymers are not satisfactory from the viewpoint of increasing impact strength.

Thus, an improvement in the impact strength of vinyl chloride-type polymers can be achieved with compositions obtained by incorporating unsaturated polymers or impact-resistant resins in vinyl chloride-type polymers and with grafted products obtained by graft-copolymerizing vinyl chloride with unsaturated polymers, but these blends and products are not satisfactory because the superior properties of the vinyl chloride-type polymers, for example, mechanical properties such as tensile strength, rigidity and hardness, transparency, and heat resistance, are deteriorated.

Previously, it was found that a polymer obtained by ring-opening polymerization of 5-cyano-bicyclo[2,2,1-]heptene-2 had various superior properties, and a process was suggested for its production [e.g., as disclosed in Japanese Pat. Publication No. 23720/75 (corresponding to U.S. Pat. No. 3,856,758) and U.S. Pat. application Ser. No. 714,833, filed Aug. 16, 1976].

Furthermore, it was found that a composition of superior quality was obtained by incorporating a ring-opened polymer of 5-cyano-bicyclo[2,2,1]heptene-2 obtained by the above-described method in a vinyl chloride-type polymer [e.g., as disclosed in Japanese Patent Application (OPI) No. 52246/74 (corresponding to U.S. Pat. No. 4,021,510)]. This composition has improved heat resistance and impact strength without a deterioration in the superior mechanical properties, such as tensile strength and hardness, and transparency of the vinyl chloride-type polymer, and therefore is better than the compositions described hereinabove. However, the improved impact strength of this composition is not entirely satisfactory from the viewpoint of practical applicability. Especially when such a composition is molded into articles requiring high impact strength (such as various machine component parts, automotive parts, window frames, helmets, and component parts of electric machinery and appliances), the impact strength of these molded articles is not sufficiently high.

It was further discovered that a composition having superior impact strength was obtained by incorporating an unsaturated polymer in a ring-opened polymer of 5-cyano-bicyclo[2,2,1]heptene-2 (e.g., as disclosed in Japanese Patent Application (OPI) No. 45853/75 and U.S. Pat. application Ser. No. 501,243, filed Aug. 28, 1974). Although this composition has improved impact strength, other mechanical properties such as tensile strength and hardness are deteriorated.

Investigations were thus made in order to obtain compositions having good impact strength and other mechanical properties. As a result, it was found that by incorporating an unsaturated polymer and a vinyl chloride-type polymer in this ring-opened polymer of 5-cyano-bicyclo[2,2,1]heptene-2, a composition having relatively good impact strength and heat resistance can be obtained (e.g., as disclosed in Japanese Pat. application (OPI) No. 14846/75). When the amount of the unsaturated polymer is relatively large, the impact strength of the composition is superior, but the other mechanical properties are deteriorated. On the other hand, when the proportion of the unsaturated polymer is relatively small, the mechanical properties such as tensile strength and hardness are good, but the composition is not satisfactory from the standpoint of improving impact strength.

SUMMARY OF THE INVENTION

With the above background in mind, various investigations have additionally been made in order to obtain compositions having superior impact strength while retaining the other good mechanical properties. These investigations led to the discovery that compositions having superior impact strength and other good mechanical properties can be obtained by blending a vinyl chloride-type polymer with a polymer obtained by ring-opening polymerizing 5-cyano-bicyclo[2,2,1]heptene-2, or a major amount of 5-cyano-bicyclo[2,2,1]heptene-2 and a minor amount of a cycloolefin-type compound, in the presence of an unsaturated polymer (this ring-opened polymer of 5-cyano-bicyclo[2,2,1]heptene-2 or of 5-cyano-bicyclo[2,2,1]heptene-2 and cycloolefin-type compound is referred to hereinafter as a "norbornene-type polymer").

According to the present invention, there is provided a resin composition having superior mechanical properties, the composition comprising (A) about 1 to about 95% by weight of a polymer obtained by ring-opening polymerization of (1) about 99 to about 25 parts by weight of either (a) 5-cyano-bicyclo[2,2,1]-heptene-2 or (b) a mixture of at least about 50 mole % of 5-cyano-bicyclo[2,2,1]heptene-2 and at most about 50 mole % of a cycloolefin-type compound in the presence of (2) about 1 to about 75 parts by weight of an unsaturated polymer containing a carbon-carbon double bond in the molecule, and (B) about 99 to about 5% by weight of (1) a vinyl chloride homopolymer and/or (2) a copolymer containing at least about 50 mole % of vinyl chloride units.

BRIEF DESCRIPTION OF THE ACCOMPANYING DRAWINGS

DETAILED DESCRIPTION OF THE INVENTION

Figure 1:
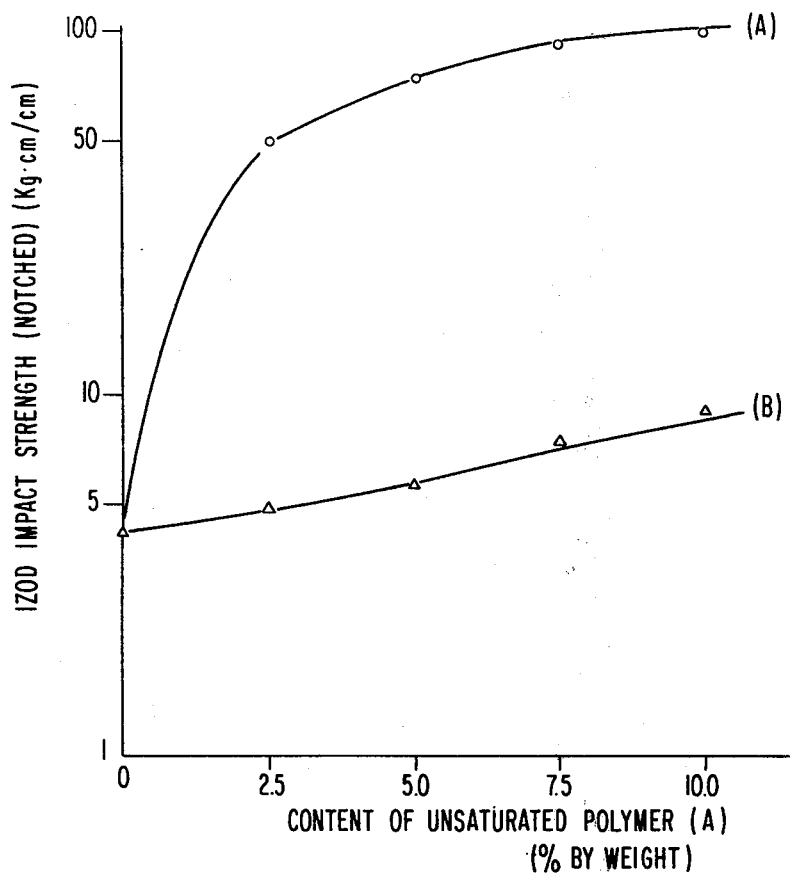
FIG. 1 shows the relationship between the content of Unsaturated Polymer (A) in accordance with Method A (designated "A") and of Unsaturated Polymer (A) in accordance with Method B (designated "B") (as the abscissa) and the Izod impact strength (notched) of the press-formed plate (as the ordinate), which relationship is shown in Table 4 hereinafter described.
Figure 2:
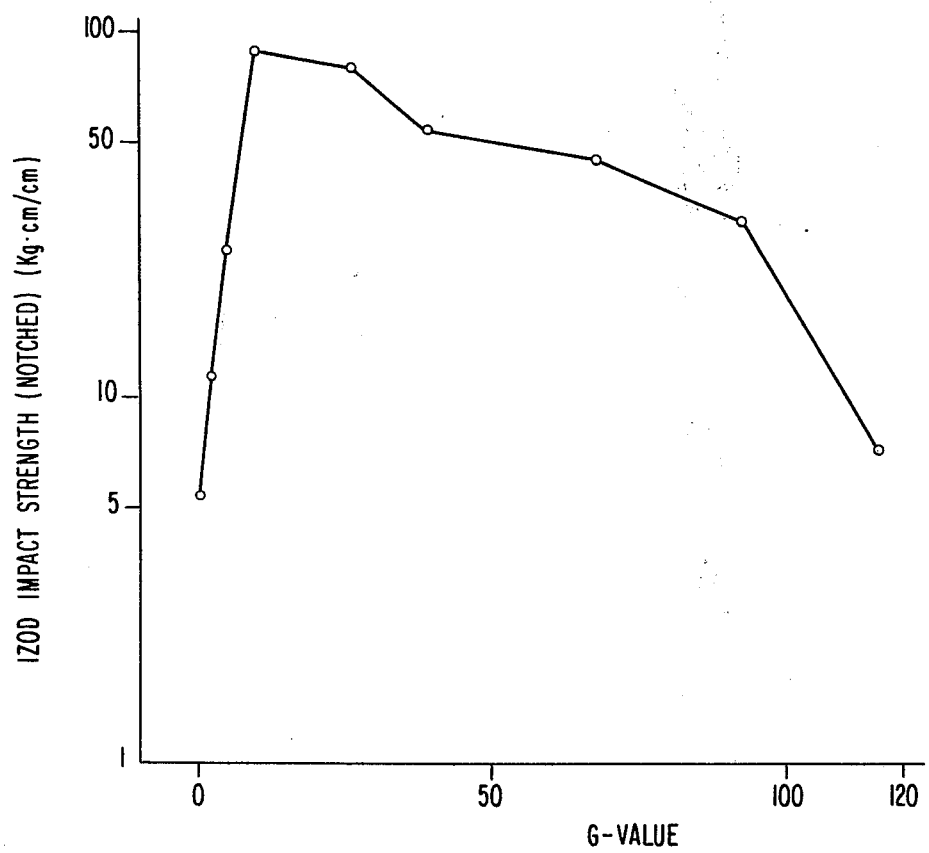
FIG. 2 shows the relationship between the G-value (as the abscissa) and the Izod impact strength (notched) (as the ordinate), which relationship is shown in Tables 5-1 and 5-2 hereinafter described.

The resin composition obtained by the present invention provides a marked improvement in the impact strength of a vinyl chloride-type polymer, and scarcely no appreciable deterioration in the mechanical properties, such as tensile strength and hardness of the vinylchloride type polymer occurs. Moreover, the heat resistance of the vinyl chloride-type polymer is frequently increased by this composition. These superior properties are believed to be due not merely to the blending of these specific components, but to some synergistic action of the mixed components.

The resin composition obtained by incorporating an unsaturated polymer or both an unsaturated polymer and a resinous polymer in the ring-opened polymer exhibits feasible impact strength only when the proportion of the rubber incorporated is relatively high. In contrast, the composition of this invention exhibits superior impact strength even when the amount of the unsaturated polymer is relatively low.

When a norbornene-type polymer having a relatively low molecular weight of the type disclosed in Japanese Patent Application (OPI) No. 14846/75 (e.g., with an intrinsic viscosity ($\eta_{inh}$) of about 0.40) is used in order to improve the processing characteristics of the resulting compostion, the impact strength of the composition of the ring-opened polymer and the unsaturated polymer or both the unsaturated polymer and the resinous material is not improved very much in spite of the inclusion of the unsaturated polymer. In contrast, the composition of this invention has a markedly improved impact strength even when a norbornene-type polymer of a relatively low molecular weight is used, and therefore, it has both superior impact strength and processing characteristics.

Furthermore, by choosing the type of unsaturated polymer and the cycloolefin-type compound used in the production of the norbornene-type polymer, the composition obtained by this invention can have superior transparency.

The norbornene-type polymer used in this invention is obtained by ring-opening polymerization of about 99 to about 25 parts by weight of 5-cyano-bicyclo[2,2,1]heptene-2 (to be referred to hereinafter as a "cyano-type norbornene derivative") or a mixture of at least about 50 mole % of this cyano-type norbornene derivative with at most about 50 mole % of a cycloolefin-type compound in the presence of about 1 to about 75 parts by weight of an unsaturated polymer. The details of ring-opening polymerization are described in Japanese Patent Application (OPI) No. 59500/75, which disclosure is herein incorporated by reference.

The cycloolefin-type compound used to produce the norbornene-type polymer is a compound which contains therein at least one unsubstituted —CH=CH— moiety and can be polymerized alone when brought into contact with a metathesis catalyst, and includes monocyclic monolefin-type compounds, non-conjugated cyclic polyene-type compounds, and polycyclic olefin-type compounds.

Suitable monocyclic monolefin-type compounds which can be used are expressed by the following general formula (I)

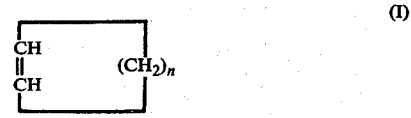

wherein n is an integer of 3 to 20.

Typical examples of monocyclic monolefin-type compounds are cyclopentene, cycloheptene, cyclooctene, cyclodecene and cyclododecene; and monocyclic monolefin-type compounds substituted with at least one hydrocarbon group containing up to 10 carbon atoms selected from alkyl groups (e.g., CH$_3$, C$_2$H$_5$, etc.), alkenyl groups (e.g., —CH=CH$_2$) and aryl groups (e.g., phenyl).

Suitable non-conjugated cyclic polyene-type compounds which can be used are expressed by the following general formulae (II) and (III)

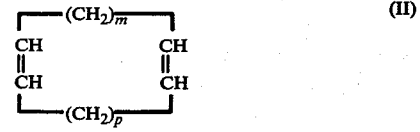

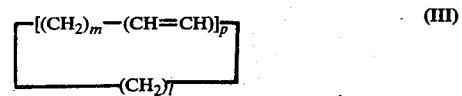

wherein l is 0 or an integer of 1 to 20, and m and p are integers of 2 to 20.

Typical examples of non-conjugated polyene-type compounds are 1,5-cyclooctadiene and 1,5,9-cyclododecatriene. Furthermore, non-conjugated polyene-type compounds of the general formulae (II) and (III) substituted with at least one hydrocarbon group containing up to 10 carbon atoms as described above for the general formula (I) or a halogen atom (such as 1-chloro-1,5-cyclooctadiene and 1-methyl-1,5-cyclooctadiene) can also be used. Still further, cyclic oligomers which are obtained by metathetic oligomerization of an olefin of the general formula (I) can also be used as non-conjugated polyene-type compounds.

Suitable polycyclic olefin-type compounds which can be used are compounds which contain 2 to 10, preferably 2 to 4, rings and 1 to 5, preferably 1 to 2, carbon-carbon double bonds. Typical examples of these compounds include bicyclo[2,2,1]-heptene-2 (norbornene), 5-methyl-1-bicyclo[2,2,1]heptene-2, 5-vinyl-bicyclo[2,2,1]heptene-2, 5-ethylidene-bicyclo[2,2,1]heptene-2, 5-isopropenyl-bicyclo[2,2,1]heptene-2, dicyclopentadiene, bicyclo[2,2,1]hepta-2,5-diene (norbornadiene), and 1,4;5,8-dimethano-1,2,3,4,4a,5,8,8a-octahydronaphthalene.

Cyclic oligomers (generally having a degree of polymerization of at most about 100) obtained, for example, by metathetically polymerizing cycloolefin-type compounds of the general formula (I) or (II) can also be used as the nonconjugated cyclic polyene-type compounds of the general formula (III) in the production of the norbornene-type polymer used in this invention.

In producing the norbornene-type polymer used in this invention, the polycyclic olefin-type compounds, above all those polycyclic olefin-type compounds having one norbornene ring, are preferred of these cycloolefin-type compounds.

The ratio of the cycloolefin-type compound to be copolymerized is at most about 50 mole %, preferably not more than 40 mole %, especially preferably not more than 30 mole %. If the proportion of the cycloolefin-type compound is more than about 50 mole %, the heat resistance and tensile strength of the resulting composition are deteriorated when a monocyclic monoolefin-type compound is used; or when a non-conjugated cyclic polyene-type compound or a polycyclic olefin-type compound is used, a gel-like product may be formed in the production of the norbornene-type polymer.

Suitable unsaturated polymers which can be used are polymers having a carbon-carbon double bond, and include, for example, butadiene-type unsaturated polymers mainly comprising butadiene (for example, butadiene homopolymer rubber, a styrene/butadiene copolymer rubber, an acrylonitrile/butadiene copolymer rubber); chloroprene-type rubbers; isoprene-type rubbers; natural rubbers; ethylene/propylene/diene terpolymers; and cycloolefin-type rubbers. The unsaturated polymer generally has a Mooney viscosity of about 10 to about 200, preferably 20 to 150, especially preferably 30 to 130. Graft copolymers obtained by grafting a monomer (generally styrene, acrylonitrile, methyl methacrylate, vinyl chloride, etc.) to these unsaturated polymers can also be used as the unsaturated polymer. Preferably, these unsaturated polymers have at least one carbon-carbon double bond, especially at least 10 carbon-carbon double bonds, per 1000 carbons of the unsaturated polymers. These unsaturated polymers are copolymerizable with a norbornene monomer at the C=C bond moiety. When the Mooney viscosity of the unsaturated polymers is too low (i.e., the molecular weight is low), the impact strength of the resulting composition cannot be improved, and on the contrary, when it is too high (i.e., the molecular weight is high), not only is the production of copolymer difficult in practical use but also the moldability of the resulting composition is low.

Of these unsaturated polymers a styrene/butadiene copolymer is especially preferred. Such a copolymer has a butadiene content of about 50 to about 95% by weight, preferably 60 to 85% by weight. When the butadiene content exceeds about 95% by weight, the transparency of the resulting copolymer is impaired. If the butadiene content is less than about 50% by weight, it is difficult to prepare a composition having superior impact strength from the styrene/butadiene copolymer. The styrene/butadiene copolymer may be obtained by radical polymerization or anionic polymerization. A styrene/butadiene copolymer obtained by radical polymerization contains large amounts of impurities which tend to poison the catalyst during the preparation of copolymer. Thus, the styrene/butadiene copolymer obtained by radical polymerization should be purified sufficiently. On the other hand, a styrene/butadiene copolymer obtained by anionic polymerization contains little impurities, and is therefore preferred.

The styrene/butadiene copolymer may be a random copolymer or a block copolymer, the latter being preferred from the standpoint of impact strength. The block copolymer contains various types of blocks such as a single block of S-B, a tereblock of S-B-S, a multiblock of S-(B-S)$_n$, and a radical block of (S-B)$_n$X, but a tereblock copolymer, a multiblock copolymer and a radical block copolymer are preferred.

The proportion of the unsaturated polymer in the norbornene-type polymer used in this invention is about 1 to about 75% by weight, preferably 1.5 to 60% by weight, especially preferably 2.0 to 50% by weight. If the proportion of the unsaturated polymer in the norbornene-type polymer is less than about 1% by weight, a composition having superior impact strength cannot be obtained. On the other hand, if the proportion of the norbornene-type polymer exceeds about 75% by weight, the mechanical properties, such as tensile strength and hardness, of the resulting composition are degraded undesirably.

The ring-opening polymerization is carried out in the presence of a catalyst comprising an organometallic compound and a transition metal compound, a catalyst comprising an organometallic compound, a transition metal compound and an activating agent, a catalyst obtained by reacting an organometallic compound, an oxide of tungsten and/or molybdenum, and a Lewis acid, or a catalyst system obtained from the above reaction product and an activating agent at about −50° C. to about +250° C. (preferably 20° to 200° C., especially preferably 0° to 150° C.) in the absence or presence of an inert organic solvent, e.g., as disclosed in U.S. Pat. application Ser. No. 714,833, filed Aug. 16, 1976.

Suitable organometallic compounds which can be used include organometallic compounds containing at least one metal of Groups IA, IIA, IIB, IIIB, IVA and IVB of the periodic table. Some of these organometallic compounds can be expressed by the following general formula (IV)

$$MR_1R_2\ldots R_z \qquad (IV)$$

wherein M is a metal of Groups IA, IIA, IIB, IIIB, IVA and IVB of the periodic table; $R_1, R_2, \ldots R_z$ each represents a hydrogen atom, a halogen atom or an organic group containing up to 20 carbon atoms selected from the group consisting of alkyl (e.g., methyl, ethyl, propyl, butyl, etc.), alkenyl, aryl (e.g., phenyl, tolyl, etc.), alkoxy (e.g., methoxy, ethoxy, propoxy, butoxy, etc.), phenoxy and cyclopentadienyl groups, and two or more $R_1, R_2 \ldots R_z$ groups may be the same or different, but at least one of them must be a hydrogen atom or the organic group; and z is the maximum atomic valence of the above metal M or a valence smaller than the maximum atomic valence of M.

Other useful organometallic compounds include an equimolar complex of the organometallic compound of the general formula (IV) and pyridine, triphenyl phosphine or diethyl ether, a reaction product formed between 1 mole of the organometallic compound of the general formula (IV) and at most 2.0 moles of water, a double salt of two kinds of the above organometallic compounds of the general formula (IV), aluminum-siloxane-type compounds, and aluminum-amide type compounds.

Commonly used among these compounds are organoaluminum compounds, and the reaction products formed between organoaluminum compounds and water. Typical examples of these are disclosed, for example, in Japanese Patent Publication No. 23720/75, Japanese Patent Application (OPI) Nos. 67999/74, 77999/74 (corresponding to U.S. Pat. No. 3,856,758), 71800/75, 75300/75 and 55400/76, Japanese Pat. applications Nos. 112068/75 (corresponding to U.S. Pat. No 3,959,234), 112534/75, 116324/75, 117664/75 and 120317/75, U.S. Pat. Nos. 4,021,510 and 4,028,482, and U.S. Pat. application Ser. No. 714,833, filed Aug. 16, 1976.

Typical examples of the transition metal compounds are compounds of tungsten, molybdenum, rhenium, tantalum or niobium which contain a hydrogen atom, a halogen atom, a cyclopentadienyl group, an acetylacetone residue, carbon monoxide (a carbonyl group), or acetonitrile; and complexes of these compounds with pyridine or triphenylphosphine. Of these compounds, the tungsten and molybdenum compounds are preferred. Typical examples of such compounds are disclosed, for example, in Japanese Patent Publication No. 23720/75, Japanese Pat. application (OPI) Nos. 67999/74, 77999/74, 58200/75, 61500/75, 71800/75 and 75300/75, and U.S. Pat. Nos. 3,856,758.

Typical examples of other transition metal compounds and double salts containing transition metals (especially tungsten) are disclosed in Japanese Pat. applications Nos. 112068/75, 112534/75, 116324/75, 117664/75, and 120317/75.

Further, other examples include the reaction products formed between an oxide of tungsten and/or molybdenum and Lewis acids (such as phosphorus pentachloride, phosphorus trichloride, phosphorus oxytrichloride, and aluminum chloride) (e.g., as disclosed in Japanese Patent Application (OPI) No. 112500/75, Japanese Pat. application No. 103060/75 and U.S. Pat. application Ser. No. 714,833, filed Aug. 16, 1976.

Examples of suitable activating agents (i.e., electron donor compounds) include water, hydrogen peroxide, oxygen-containing compounds nitrogen-containing compounds, halogen-containing compounds, phosphorus-containing compounds, sulfur-containing compounds, and metal-containing organic compounds. Typical examples of these activating agents are described in Japanese Pat. applications Nos. 112068/75, 112534/75, 116324/75, 117664/75, 120317/75 and 17980/76, and U.S. Pat. No. 3,856,758.

Of the electron donor compounds, organic compounds (including metal-containing compounds) desirably have at most 20 carbon atoms, especially preferably not more than 18 carbon atoms.

The ratio of the organometallic compound and the activating agent (if such is used) to the transition metal compound or the tungsten metal and molybdenum metal in the reaction product formed between an oxide of tungsten or molybdenum and a Lewis acid, and the amount and type of the inert organic solvent (if such is used) are described in the above-cited patent references.

The norbornene-type polymer used in this invention can be obtained by ring-opening polymerization using the procedure described hereinabove. The molecular weight of the polymer can be controlled by adding a molecular weight controlling agent such as an α-olefin containing at most 15 carbon atoms (such as ethylene, hexene-1 or octene-1), an internal olefin containing up to 20 carbon atoms (such as hexene-2, or octene-2), a non-conjugated diolefin containing up to 20 carbon atoms (such as 1,4-hexadiene), and the molecular weight controlling agents disclosed in Japanese Pat. application Nos. 56494/75, 56495/75, 56496/75 and 56497/75, U.S. Pat. No. 3,856,758 and U.S. Pat. application Ser. No. 714,833 filed Aug. 16, 1976. The amount of the molecular weight controlling agent is generally at most 20 moles, preferably not more than 10 moles, especially preferably not more than 5 moles, per 100 moles of the monomers.

Suitable metathetic polymerization temperature conditions which can be used are disclosed in U.S. Pat. No. 3,856,758.

After the completion of the ring-opening polymerization, the resulting polymer can be recovered by several methods. For example, the procedures of catalyst removal and polymer recovery which are generally practiced in the solution-polymerization of isoprene, butadiene, etc. can be employed.

Other methods of purification (post-treatment) are described, for example, in Japanese Pat. Publication No. 23720/75, Japanese Pat. Application (OPI) Nos. 67999/74, 77999/75, 130500/74, 58200/75, 71800/75, 75300/75, 103600/75, 153100/75, 159598/75 and 160400/75, U.S. Pat. No. 3,856,758, and U.S. Pat. Application Ser. No. 714,833 filed Aug. 16, 1976.

Thus, the norbornene-type polymer used in this invention can be prepared by the methods disclosed in the above-cited patent references.

The structure of a norbornene-type polymer derived from 5-cyano-bicyclo[2,2,1]heptene-2 and a styrene/butadiene copolymer, a typical example of the copolymer obtained by the above-described method, by fractionation is defined as follows:

When the polymer (hereinafter "whole polymer") is extracted with acetonitrile at room temperature (about 20°–30° C.), only a homopolymer of 5-cyano-bicyclo[2,2,1]heptene-2 is obtained as a soluble fraction. When the extraction residue is dried and extracted with ethyl acetate, only the unreacted styrene/butadiene copolymer is separated as a soluble fraction. The IR spectrum of the extraction residue shows an absorption due to the nitrile group at 2245 cm$^{-1}$, and an absorption based on the phenyl group of the styrene/butadiene copolymer at 1603, 1495 and 710 cm$^{-1}$. This fact shows that the portion insoluble in acetonitrile and ethyl acetate is a copolymer of 5-cyano-bicyclo[2,2,1]heptene-2 and a styrene/butadiene copolymer. The measure (G) of the ratio of the extraction residue in the whole polymer to the unsaturated polymer is defined by the following relationship.

$$G = (y/x) \times 100$$

wherein x is the content in % by weight of the styrene/butadiene copolymer in the whole polymer, and y is the content in % by weight of the extraction residue (the portion insoluble in acetontrile and ethyl acetate).

In order to obtain compositions having good impact strength and transparency, G should be about 3 to about 100, preferably 5 to 75, especially preferably 10 to 50.

The vinyl chloride-type polymer used in this invention denotes a homopolymer obtained by polymerizing vinyl chloride alone, and copolymers obtained by copolymerizing at least about 50 mole % of vinyl chloride and not more than about 50 mole % of at least one monomer such as vinyl acetate, vinylidene chloride, ethylene, propylene, acrylonitrile and maleic acid. These vinyl chloride-type polymers (homopolymer and copolymers) are widely produced commercially using an emulsion polymerization method (e.g., as disclosed in U.S. Pat. No. 2,843,576), a suspension polymerization method (e.g., as disclosed in U.S. Pat. No. 2,875,187) or a bulk polymerization method (e.g., as disclosed in U.S. Pat. No. 2,831,843). In performing the present invention, vinyl chloride-type polymers having a degree of polymerization of about 450 to about 1500 are preferred.

Since vinyl chloride-type polymers are unstable to heat or light, they tend to be partly deteriorated in mixing and processing steps to be described. Hence, they may contain stabilizers (anti-dehydrochlorinating agents) such as metal soaps (e.g., calcium stearate, cadmium stearate, etc.), tin compounds (e.g., dibutyltin maleate, dibutyltin dilaurate, etc.) and epoxy-containing compounds (e.g., epoxydized soybean oil).

The weight ratio of the norbornene-type polymer (A) to the vinyl chloride-type polymer (B) [(A:B)] is about 1 to about 95 : about 99 to about 5, preferably 2 to 90:98 to 10, especially preferably 5 to 75:95 to 25. If the proportion of the norbornene-type polymer (A) in the resulting composition is less than about 1% by weight, the impact strength of the composition is unsatisfactory. On the other hand, if the proportion of the vinyl chloride-type polymer (B) in the composition in less than about 5% by weight, the inherent properties of the polymer (B) (such as tensile strength, hardness, and processability) are impaired.

Mixing of the components of the composition of this invention can be performed employing a method of melt-kneading using a mixer such as an extruder, a roll mill and a Banbury mixer which is used generally to mix synthetic resins and rubbers, and a dry-blending method using a mixer such as a ribbon mixer and a tumbler. The melt-kneading method is preferred because this method provides a uniform composition relatively easily, its operation is relatively simple and easy, and it is economically advantageous. When a more uniform composition is desired, two or more of the above-described methods may be used (for example, first the components are mixed using a ribbon mixer, and the mixture is melt-kneaded using an extruder).

As described hereinabove, the composition obtained by the present invention has markedly improved impact strength over the resinous polymer employed, and the inherent properties, such as tensile strength, hardness and processability, of the resinous polymer are scarcely degraded. A further characteristic feature is that the composition has superior impact strength even when it has a relatively low content of the unsaturated polymer (especially the unsaturated polymer used in producing the norbornene-type polymer).

When a norbornene-type polymer having a relatively low molecular weight is used in order to improve the processing characteristics of the resulting composition, the impact strength of a composition comprising the ring-opened polymer and the unsaturated polymer, or a composition comprising the resinous material and the unsaturated polymer is not improved very much in spite of the inclusion of the unsaturated polymer. However, the composition of this invention has a markedly improved impact strength even when a norbornene-type polymer having a relatively low molecular weight is used. Thus, such a composition of this invention has superior processing characteristics as well as high impact strength.

The compositions obtained by this invention have the superior properties as described hereinabove. Above all, those containing 0.5 to 50% by weight, especially 1.0 to 30% by weight, of an unsaturated polymer (in the case of a graft copolymer, the unsaturated polymer used to produce the graft copolymer) used in producing the norbornene-type polymer are preferred from the standpoint of impact strength and other properties.

Since the compositions obtained by this invention have the superior properties as described hereinabove, they can be used directly. As desired, however, the compositions of this invention may contain additives generally used for synthetic resins, such as stabilizers against light (ultraviolet light), heat, oxygen and ozone, plasticizers, lubricants, fire retardants, reinforcing agents, fillers, coloring agents, antistatic agents, foaming agents and agents for improving the electrical properties. Compositions containing such additives are also within the scope of this invention.

The compositions of this invention can be processed into films, sheets, etc. by molding methods generally used for synthetic resins, such as injection molding, extrusion molding, compression molding, blow molding and casting.

When the composition is heated at the time of mixing and processing, relatively low temperatures must be used in view of the stability of the composition. Generally, the temperature is about 240° C. at the highest, and preferably not more than 210° C. Preferably, the mixing and processing are carried out shielded from the atmosphere because the composition may be deteriorated by oxygen in the air.

The compositions obtained by this invention, and the compositions of this invention and additionally containing additives have the superior properties described hereinabove, and can be processed into various useful shapes employing various molding methods. Examples of such molded articles include containers such as bottles and buckets, films and processed products thereof (such as bags), stationery, packaging materials, pipes and joints for municipal water services, sundries for daily use, kitchenware, component parts of machines and appliances, component parts of electric appliances (including illuminating devices), agricultural and fishery devices and the component parts thereof, interior decoration materials, and toys. Compositions having superior fire retardancy (especially those classified as 94 V-1 in accordance with Underwriter Laboratory standards) can be suitably used to form exterior and interior component parts of electric appliances (such as electric portable computers, and television receiver sets).

The following examples are given to illustrate the present invention in more detail. Unless otherwise indicated herein, all parts, percents, ratios and the like are by weight.

The inert organic solvents, monomers, and molecular weight controlling agents used in these examples were substantially dried before use, and the ring-opening polymerizations and reactions were carried out in an atmosphere of substantially dried nitrogen gas.

The various properties given in the examples were measured using the following methods.

Izod Impact Strength
ASTM D-256-56
Tensile Strength and Elongation
ASTM D-638-58T
Vicat Softening Point
ASTM D-1525-58T
Melt Viscosity
Measured at a temperature of 200° C. under a load of 200 kg using a Koka-type flow tester with a nozzle having a diameter of 1 mm and a length of 10 mm.
Fire Retardancy
ASTM D-635 (thickness of sample: 1/8 inch; NB: non-combustile, SB: combustible)

EXAMPLE 1

(A) Preparation of a Norbornene-Type Polyer (Polymer 1)

A 5-liter autoclave was charged with 400 g of 5-cyano-bicyclo[2,2,1]heptene-2 as a monomer, 40 g of a styrene/butadiene block copolymer rubber [Solprene 411, a tradename for a product of Asahi Chemical Industry Co., Ltd.; styrene content: 30% by weight; Mooney viscosity (270° F.): 85; purified by reprecipitation from a solution prepared by adding a 10% toluene solution to 5 times by volume of methanol and dried under reduced pressure; to be referred to hereinafter as "Unsaturated Polymer (A)"] as an unsaturated polymer, 4.15 ml of n-hexane-1 as a molecular weight controlling agent, and 800 ml of 1,2-dichloroethane as an inert organic solvent. The mixture was stirred at 65° C. to form a uniform solution. To the solution were added 16.8 ml of a 1,2-dichloroethane solution of tungsten hexachloride (I) and 2,2-dimethoxypropane (II) [molar ratio of (I): (II) = 1: 2; concentration of (I) 0.2 mole/liter] and 21.0 ml of a toluene solution of diethylaluminum chloride (concentration: 1.0 mole/liter). While the mixture was being stirred well, polymerization was performed at 65° C. for 4 hours. A mixture of 2.1 g of bis(2-hydroxy-3-tert.-butyl-5-methylphenyl)methane, 50 ml of methyl alcohol and 800 ml of 1,2-dichloromethane was added to terminate the polymerization. The resulting reaction solution was poured into 10 liters of methyl alcohol containing 5% by volume of a 42 wt.% hydrochloric acid aqueous solution to precipitate the polymer (the reaction product). The product was repeatedly purified by re-precipitation using 1,2-dichloroethane (EDC) as a good solvent and methyl alcohol as a poor solvent, and then dried for 24 hours at 60° C. under reduced pressure. 425 g of a polymer [to be referred to hereinafter as Polymer (1)] was obtained.

Acetonitrile (400 ml) was added to 20 g of the resulting polymer, and the mixture was stirred for 3 hours at room temperature. The insoluble portion was precipitated by centrifugal separation, and the supernatant liquid was decanted off. A fresh supply of acetonitrile (200 ml) was added, and the same procedure as described above was repeated. The insoluble portion was withdrawn, washed with 50 ml of methanol, and dried at 40° C. for 10 hours to obtain 2.78 g (13.9% by weight based on the polymer) of an insoluble portion.

The acetonitrile solution was dried in a vacuum dryer at 80° C. for 10 hours to remove the acetonitrile, and to obtain 17.79 g (88.9% based on the polymer) of an acetonitrile-soluble portion having an $$\eta_{inh}^{EDC} \text{ of } 0.40.$$

$$c = 0.2 \text{ g/dl}$$

Ethyl acetate (50 ml) was added to the acetonitrile-insoluble portion, and the mixture was stirred at room temperature for 3 hours. The insoluble portion was precipitated by centrifugal separation, and the supernatant liquid was decanted off. To the precipitate was added 50 ml of ethyl acetate, and the same operation as described above was performed to obtain an insoluble portion. The insoluble portion was washed with 50 ml of methanol, and dried in vacuo at 30° C. for 10 hours.

The acetonitrile-insoluble portion contained 0.32 g (1.6% by weight based on the polymer) of an ethyl acetate-insoluble portion having an $$\eta_{inh}^{EDC} \text{ of } 1.28.$$

$$c = 0.2 \text{ g/dl}$$

The ethyl acetate solution was dried in a vacuum dryer at 40° C. for 10 hours to remove the ethyl acetate, and to obtain 1.71 g (8.6% by weight based on the polymer) of an ethyl acetate-soluble portion (polymer) having an $$\eta_{inh}^{EDC} \text{ of } 0.66.$$

$$c = 0.2 \text{ g/dl}$$

The polymer and the fractionated products (the acetonitrile-soluble portion, the ethyl acetate-soluble portion, and the acetonitrile/ethyl acetate-insoluble portion) were each dissolved in 1,2-dichloroethane, and formed into films using a casting method. The infrared spectra of the films were examined. It was found the the polymer contained 9.5% by weight of the styrene/butadiene copolymer. The acetonitrile-soluble portion and the ethyl acetate-soluble portion were a ring-opened polymer of 5-cyano-bicyclo[2,2,1]heptene-2 and unreacted Solprene 411, respectively. The IR spectrum of portion which was insoluble both in acetonitrile and ethyl acetate showed an absorption of a nitrile group at 2245 cm$^{-1}$, and an absorption of a phenyl group at 1603, 1495, and 710 cm$^{-1}$, and thus was determined to be a polymer. G=16.8.

Polymer (1) was kneaded with 0.5% by weight, based on Polymer (1), of bis(2-hydroxy-3-tert.-butyl-5-methylphenyl)methane as a stabilizer using a roll mill (the roll surface had a temperature of 180° C.) for 5 minutes. The resulting mixture was press-formed at 200° C. to prepare test samples. The resulting test samples had an Izod impact strength (notched) of 102.4 kg.cm/cm, a tensile strength of 409 kg/cm$^2$, an elongation of 215%, and a Vicat softening point of 121.2° C. Polymer (1) had a melt viscosity of 9.5 × 10$^{-3}$ cc/sec.

(B) Production of Blended Composition

Fifty parts by weight of Polymer (1) obtained in (A) above, 50 parts by weight of a vinyl chloride homopolymer [degree of polymerization: about 800; Izod impact strength (notched): 2.9 kg.cm/cm; tensile strength: 541 kg/cm$^2$; elongation: 130%; Vicat softening point: 87.9° C.; melt viscosity: 30.2 × 10$^{-3}$ cc/sec.; fire retardancy: NB; to be referred to hereinafter as "PVC(1)" as a vinyl chloride-type polymer], and 3.0 parts by weight of dibutyltin maleate and 0.5 part by weight of 2,2'-methylenebis(4-methyl-6-tert-butylphenol) as stabilizers were kneaded with a roll mill (the roll surface had a temperature of 180° C.) for 5 minutes. The resulting mixture was press-formed at 200° C. The press-formed plates had an Izod impact strength (notched) of 80.9 kg.cm/cm, a Vicat softening point of 117.5° C., a tensile strength of 480 kg/cm$^2$, an elongation of 180%, and a melt viscosity of 17.6 × 10$^{-3}$ cc/sec.

EXAMPLE 2

(A) Production of norbornene-type polymers

Polymerization was carried out in the same way as in Example 1 except that the Unsaturated Polymer (A) used as an unsaturated polymer was replaced by each of a styrene/butadiene block copolymer rubber [Solprene 475, a tradename for a product of Asahi Chemical Industry Co., Ltd.; styrene content: 40% by weight; to be referred to hereinafter as "Unsaturated Polymer (B)"], a styrene/butadiene random copolymer rubber [Solprene 1204, a tradename for a product of Asahi Chemical Industry Co., Ltd.; Mooney viscosity (212° F.): 60; styrene content: 25% by weight; to be referred to hereinafter as "Unsaturated Polymer (C)"], a styrene/butadiene copolymer rubber [JSR-1502, a tradename for a product of Japan Synthetic Rubber Co., Ltd.; Mooney viscosity: 50; to be referred to hereinafter as "Unsaturated Polymer (D)"], a butadiene rubber [BR-01, a tradename for a product of Japan Synthetic Rubber Co., Ltd.; Mooney viscosity (ML100° C.): 45; cis-1,4 content: 97.5%; to be referred to hereinafter as "Unsaturated Polymer (E)"], an acrylonitrile/butadiene copolymer rubber [Hycar 1043, a tradename for a product of Nippon Zeon Co., Ltd.; acrylonitrile content: 29; Mooney viscosity: 80; to be referred to hereinafter as "Unsaturated Polymer (F)"], an isoprene homopolymer rubber [Ameripol SN600, a tradename for a product of Goodrich Company; Mooney viscosity: 86; to be referred to hereinafter as "Unsaturated Polymer (G)"], an ethylene/propylene/ethylidenenorbornene terpolymer rubber [Mitsui EPT 3045, a tradename for a product of Mitsui Petro-Chemical Industries, Ltd.; Mooney viscosity: 40; iodine value; 12; to be referred to hereinafter as "Unsaturated Polymer (H)"], and a methyl methacrylate/butadiene/styrene terpolymer resin [the product produced in (B) below; to be referred to hereinafter as "Unsaturated Polymer (J):] in the amounts indicated in Table 1—1 below. The resulting polymers were recovered in the same manner as in Example 1, and were mixed with the same stabilizers as used in Example 1. The mixtures obtained were press-formed into plates. The melt viscosities of the reaction products (polymers) and the properties of the press-formed plates were determined, and the results are also shown in Table 1—1.

(B) Production of the Unsaturated Polymer(J)

A 5-liter autoclave was charged with 1,760 g of an aqueous dispersion containing 320 g of polybutadiene particles (92% of which were particles with a diameter of 0.2 micron). While maintaining the temperature of the dispersion at 60° C. under a stream of nitrogen, an aqueous solution of 32.0 g of sodium formaldehydesulfoxylate dihydrate in 160 ml of water, and 8.0 g of cumene hydroperoxide were added, and the mixture was stirred for 1 hour. Then, a mixture of 240 g of methyl methacrylate and 1.6 g of cumene hydroperoxide was added thereto, and polymerization was performed. In about 4 hours, the polymerization conversion reached 92%. A mixture of 240 g of styrene and 1.6 g of cumene hydroperoxide was added to this reaction system, and the polymerization was further continued. In about 5 hours, the polymerization conversion reached 93%. The resulting solution was coagulated by adding an aqueous solution of hydrochloric acid and sodium chloride. The precipitate was collected by filtration, thoroughly washed, and dried for one day at about 50° C. under reduced pressure to obtain a white powdery polymer (graft polymer) which contained 42.3% of the unsaturated polymer. [This graft polymer will be referred to as the "Unsaturated Polymer(J)"].

(C) Production of Blend Compositions

The same procedure as in (B) of Example 1 was performed except that instead of Polymer (1) and PVC (1) used in Example 1, (B), each of the various polymers shown in Table 1—1 below and each of PVC (1), a vinyl chloride/ethylene copolymer [average degree of polymerization: about 650; vinyl chloride content: 95% by weight; Izod impact strength (notched): 3.7 kg.cm/cm; tensile strength: 515 kg/cm$^2$; Vicat softening point: 82.3° C.; melt viscosity: 71.0 × 10$^{-3}$ cc/sec.; fire retardancy: NB; to be referred to hereinafter as "PVC (2)"], and a vinyl chloride/vinyl acetate copolymer [vinyl chloride content: 85% by weight; average degree of polymerization: about 800; Izod impact strength (notched): 6.5 kg.cm/cm; tensile strength: 476 kg/cm$^2$; Vicat softening point: 65.1° C.; melt viscosity: 45.0 × 10$^{-3}$ cc/sec.; to be referred to hereinafter as "PVC (3)"] were used in the amounts shown in Table 1-2 below. The mixtures obtained were each press-formed in the same way as in Example 1, (B). The Izod impact strength (notched), tensile strength and elongation of each of the press-formed plates and the melt viscosity of each of the mixtures were determined, and the results are also shown in Table 1-2.

Table 1-1

| Unsaturated Polymer | | Izod Impact Strength (notched) (kg.cm/cm) | Tensile Strength (kg/cm$^2$) | Vicat Softening Point (° C) | Melt Viscosity (cc/sec.) | Fire Retardancy | Designation of Norbornene Type Polymer |
|---|---|---|---|---|---|---|---|
| Type | Amount (g) | | | | | | |
| (B) | 40 | 92 | 419 | 124.2 | 9.3×10$^{-3}$ | SB | (2) |
| (C) | 20 | 81 | 430 | 120.6 | 9.8×10$^{-3}$ | " | (3) |
| (C) | 40 | 95 | 410 | 122.9 | 10.1×10$^{-3}$ | " | (4) |
| (C) | 60 | 95 | 394 | 126.5 | 9.7×10$^{-3}$ | " | (5) |
| (C) | 120 | 90 | 356 | 126.8 | 9.7×10$^{-3}$ | " | (6) |
| (D) | 40 | 86 | 414 | 122.9 | 10.2×10$^{-3}$ | " | (7) |
| (E) | 40 | 87 | 398 | 123.8 | 7.9×10$^{-3}$ | " | (8) |
| (F) | 40 | 40 | 406 | 119.7 | 11.8×10$^{-3}$ | " | (9) |
| (G) | 40 | 98 | 420 | 123.4 | 9.6×10$^{-3}$ | " | (10) |

Table 1-1-continued

| Unsaturated Polymer | | Izod Impact Strength (notched) (kg.cm/cm) | Tensile Strength (kg/cm²) | Vicat Softening Point (°C) | Melt Viscosity (cc/sec.) | Fire Retardancy | Designation of Norbornene Type Polymer |
|---|---|---|---|---|---|---|---|
| Type | Amount (g) | | | | | | |
| (H) | 40 | 91 | 415 | 124.6 | $10.2 \times 10^{-3}$ | " | (11) |
| (J) | 60 | 62 | 431 | 123.8 | $9.5 \times 10^{-3}$ | " | (12) |

Table 1-2

| Run No. | Norbornene-Type Polymer | | Vinyl Chloride-Type Polymer | | Izod Impact Strength (notched) (kg.cm/cm) | Tensile Strength (kg/cm²) | Vicat Softening Point (°C) | Melt Viscosity ($\times 10^{-3}$) (cc/sec.) | Fire Retardancy |
|---|---|---|---|---|---|---|---|---|---|
| | Type | Amount (g) | Type | Amount (g) | | | | | |
| 1 | (2) | 50 | PVC(1) | 50 | 66.8 | 487 | 118.3 | 17.6 | NB |
| 2 | (4) | 25 | " | 75 | 40.6 | 511 | 105.0 | 24.0 | " |
| 3 | (4) | 50 | " | 50 | 68.1 | 485 | 117.1 | 18.2 | " |
| 4 | (4) | 75 | " | 25 | 84.0 | 458 | 121.5 | 13.8 | " |
| 5 | (3) | 50 | " | 50 | 50.0 | 491 | 116.9 | 17.9 | " |
| 6 | (5) | 50 | " | 50 | 73.0 | 479 | 118.5 | 17.0 | " |
| 7 | (6) | 50 | " | 50 | 67.7 | 456 | 118.4 | 17.2 | " |
| 8 | (4) | 50 | PVC(3) | 50 | 70.4 | 451 | 113.5 | 23.4 | " |
| 9 | (4) | 50 | PVC(2) | 50 | 66.3 | 470 | 116.6 | 27.1 | " |
| 10 | (7) | 50 | PVC(1) | 50 | 64.2 | 480 | 118.1 | 18.2 | " |
| 11 | (8) | 50 | " | 50 | 63.0 | 471 | 118.3 | 16.1 | " |
| 12 | (9) | 50 | " | 50 | 30.9 | 475 | 114.8 | 20.0 | " |
| 13 | (10) | 50 | " | 50 | 70.2 | 483 | 117.9 | 17.5 | " |
| 14 | (11) | 50 | " | 50 | 66.9 | 485 | 118.9 | 18.2 | " |
| 15 | (12) | 50 | " | 50 | 46.3 | 486 | 119.1 | 16.6 | " |

Twenty grams of Polymer (2) was fractionated, and the following results were obtained.

| | | EDC $\eta_{inh}$ c=0.2 g/dl |
|---|---|---|
| Acetonitrile Soluble Portion | 17.91g(89.5 wt.%) | 0.41 |
| Ethyl Acetate-Soluble portion | 1.68g(8.4 wt.%) | 0.58 |
| Portion Insoluble in both Acetonitrile and Ethyl Acetate | 0.18g(0.9 wt.%) | 0.97 |
| SBR content determined from IR: | 9.2 wt.% | |
| G=9.8 | | |

Fifty parts by weight of Polymer (1) used in Example 1, 50 parts by weight of Polymer (11) used in Example 2 (Run No. 14), 50 parts by weight of PVC(1), and 3.0 parts by weight of dibutyltin maleate and 0.5 part by weight of 2,2'-methylenebis(4-methyl-6-tert-butylphenol) as stabilizers were dry-blended using a Henschel mixer. The blend was pelletized in an extruder (diameter 40 mm; cylinder temperature $C_1$ 160° C., $C_2$ 180° C. and $C_3$ and die 200° C.) while melt-kneading the mixture.

The pellets were molded into Petri dishes (each having a bottom diameter of 120 mm, a depth of 30 mm and a thickness of 2 mm) with a 5-oz injecting-molding machine under the following injecting conditions.

| Cylinder Temperature | $C_1$ 170° C, $C_2$ 200° C, $C_3$ 200° C. |
|---|---|
| Injecting Pressure (hydraulic pressure) | 50 kg/cm² |
| Mold Clamping Pressure (hydraulic pressure) | 55 kg/cm² |
| Mold Temperature | 60° C. |
| Molding Cycle | total cycle 30 seconds (injecting 10 seconds, loading 5 seconds, cooling 20 seconds) |

The properties of the molded articles were determined and the results obtained are shown in Table 2 below.

Table 2

| Sample | Dart-missile Impact Strength (*1) | Appearance of Petri Dish | | | |
|---|---|---|---|---|---|
| | | Weld (*2) | Transparency | Surface Gloss | Delamination |
| Ex. 2 (Run No. 14) | 200 | Conspicuous | Poor | Poor | Yes |
| Ex. 1 | >100 | Not conspicuous | Good | Good | No |

Note
(*1): A test specimen is set on a holder, and a dart, with a blunt point and a diameter of 35 mm, with various loads thereon was allowed to fall a distance of 2 mm onto the specimen. Then, the value at which the specimen is broken to an extent of 50 % is determined as the dart-missile impact strength.
(*2): In order to measure the dart-missile impact strength, a dish was molded using a single inlet (1 mmφ pin gate) at one side of the dish. In the weld test, a dish was injection-molded using two inlets (0.5 mmφ pin gates) separated at an angle of 120° and the weld line across the dish and approximately equi-distant from the two inlets was evaluated with the naked eye.

EXAMPLE 3

Ring-opening polymerization was performed under the same conditions as set forth in Example 1, (A) except that instead of 400 g of 5-cyano-bicyclo[2,2,1]heptene-2 [to be referred to hereinafter as Monomer (1)] used in the preparation of Polymer (1) in Example 1, (A), the Monomer (1) in the amount shown in Table 3-1 below and each of dicyclopentadienes [to be referred to hereinafter as Monomer (2)], norbornene [to be referred to hereinafter as Monomer (3)], and 1,4:5,8-dimethano-1,4,5,6,7,8,9,10-octahydronaphthalene [to be referred to hereinafter as Monomer (4)] in the amounts indicated in Table 3-1 were used. After the polymerization, the ring-opened polymers were recovered and purified in the same way as in Example 1, (A). The polymers were kneaded with stabilizers in the same way as in Example 1, (A), and press-formed into plates. The Izod impact strength, tensile strength and Vicat softening point of each of the press-formed plates were determined, and the results are also shown in Table 3-1.

Fifty parts by weight of each of the resulting polymers, 50 parts by weight of PVC(1) and 0.5 part by weight of the same stabilizer as used in Example 1, (B) were kneaded under the same conditions as set forth in Example 1, (B). The mixtures obtained were each press-formed into plates. The Izod impact strength, tensile strength and Vicat softening point of each of the press-formed plates were determined, and the results obtained are shown in Table 3-2 below.

Table 3-1

| Amount of Monomer (1) | Other Monomer | | Izod Impact Strength (notched) | Tensile Strength | Vicat Softening Point | Fire Retardancy | Designation of Polymer |
|---|---|---|---|---|---|---|---|
| | Type | Amount | | | | | |
| (g) | | (g) | (kg.cm/cm) | (kg/cm$^2$) | (° C) | | |
| 390 | (2) | 10 | 91.5 | 427 | 121.0 | SB | (13) |
| 390 | (3) | 10 | 104.5 | 420 | 122.6 | SB | (14) |
| 390 | (4) | 10 | 92.5 | 429 | 122.1 | SB | (15) |

Table 3-2

| Run No. | Type of Polymer | Izod Impact Strength (notched) | Tensile Strength | Vicat Softening Point | Fire Retardancy |
|---|---|---|---|---|---|
| | | (kg.cm/cm) | (kg/cm$^2$) | (° C) | |
| 1 | (13) | 79.6 | 488 | 117.0 | NB |
| 2 | (14) | 81.4 | 485 | 116.4 | NB |
| 3 | (15) | 77.9 | 486 | 117.5 | NB |

EXAMPLE 4

Norbornene-type polymers were produced in the same way as in Example 1, (A) except that the amounts of the unsaturated polymer (A) used as an unsaturated polymer in the production of polymer (1) in Example 1, (A) and 5-cyano-bicyclo[2,2,1]heptene-2 used as a monomer were changed.

Each of the norbornene-type polymers was mixed with PVC(1) in the same amount as 5-cyano-bicyclo[2,2,1]heptene-2 used as a monomer in the preparation of the norbornene-type polymers, under the same conditions as in Example 1, (B) to form compositions (to be referred to hereinafter as Method A).

A ring-opened polymer of 5-cyano-bicyclo[2,2,1]heptene-2 alone [reduced viscosity (measured at 30° C. in dimethylformamide in a concentration of 0.1 g/dl): 0.42; Izod impact strength (notched): 6.0 kg.cm/cm] was prepared using the same procedure as in Example 1, (A) except that Unsaturated Polymer (A) was not used. The resulting polymer, PVC(1) in the same amount as the polymer, and Unsaturated Polymer (A) in the amounts shown in Table 4 below were mixed in the same way as in Example 1, (B) to form compositions (to be referred to hereinafter as Method B).

Each of the resulting mixtures was press-formed into plates in the same way as in Example 1, (B). The content of the Unsaturated Polymer (A), and the Izod impact strength (notched) of each of the press-formed plates were determined, and the results obtained are shown in Table 4.

Table 4

| Method A | | Method B | |
|---|---|---|---|
| Content of Unsaturated Polymer (A) (wt.%) | Izod Impact Strength (notched) (kg.cm/cm) | Content of Unsaturated Polymer (A) (wt.%) | Izod Impact Strength (notched) (kg.cm/cm) |
| — | — | 0 | 4.5 |
| 2.5 | 50.1 | 2.5 | 4.9 |
| 5.0 | 75.0 | 5.0 | 5.7 |
| 7.5 | 92.2 | 7.5 | 7.4 |
| 10.0 | 101.9 | 10.0 | 9.0 |

The content of the Unsaturated Polymer (A) in each of the compositions obtained by Method A and Method B and the Izod impact strengths (notched) of the press-formed plates are plotted in FIG. 1 in which the abscissa represents the content (% by weight) of Unsaturated Polymer (A), and the ordinate represents, the Izod impact strength (kg.cm/cm).

It can be seen from the results shown in FIG. 1 that the compositions obtained by Method A (the compositions of this invention) have a very high Izod impact strength even when they have a low content of the Unsaturated Polymer (A), but that the compositions obtained by Method B have low Izod impact strength even when they have a high content of the Unsaturated Polymer (A).

EXAMPLE 5

Polymerization I

The polymerization was initiated in the same manner as described in Example 1-(A) and was performed at 70° C. for 20 hours. At this time, the conversion was found to be 98.4%. To the resulting solution was added a 10 wt.% 1,2-dichloroethane solution containing a purified styrene-butadiene block copolymer [Solprene 411] in the amounts shown in Table 5-1 below, followed by allowing the reaction to proceed for an additional 15 minute period of time. Then, the reaction was stopped in the same manner as described in Example 1-(A) to purify the polymer, which was then separated in the same manner as described in Example 1 into various polymers [Polymers (16) to (19)]. The results obtained are shown in Table 5-1 below.

Polymerization II

The polymerization was initiated in the same manner as described in Example 1-(A) and was performed for 2 hours. At this time, the conversion was found to be 60.4%. To the resulting solution was added a 10 wt.% 1,2-dichloroethane solution containing Solprene 411 in the amounts shown in Table 5-1 below, followed by allowing the reaction to proceed for an additional 15 minute period of time. Then, the reaction was stopped in the same manner as described in Example 1-(A) to purify the polymer, which was then separated in the same manner as described in Example 1 into various polymers [Polymers (20) to (27)]. The results obtained are shown in Table 5-1 below.

Polymerization III

The same procedures for the polymerization and after-purification as described in Example 1-(A) were followed except that the amount of the catalyst component was 3 times that in Example 1-(A) and the polymerization period of time and temperature were 20 hours and 70° C., respectively. Then, the resulting polymer was separated in the same manner as used in Example 1 to obtain a polymer [Polymer (23)]. The results obtained are shown in Table 5-1 below.

Table 5-1

| Type of Polymerization | Type of Polymer | Amount of Solprene 411 (g) | Yield of Polymer (g) | Content of Unsaturated Polymer (wt.%) | Intrinsic Viscosity of Polymer ($\eta_{inh}$) | G-Value of Polymer |
|---|---|---|---|---|---|---|
| Polymerization I | (16) | 0 | 418 | 9.3 | 0.39 | 92.1 |
| " | (17) | 16 | 445 | 12.3 | 0.41 | 67.5 |
| " | (18) | 57 | 489 | 19.5 | 0.40 | 38.9 |
| " | (19) | 106 | 513 | 26.7 | 0.44 | 25.8 |
| Polymerization II | (20) | 0 | 269 | 14.1 | 0.48 | 9.2 |
| " | (21) | 41 | 310 | 25.1 | 0.52 | 4.5 |
| " | (22) | 152 | 422 | 44.4 | 0.58 | 1.9 |
| Polymerization III | (23) | 0 | 428 | 9.1 | 0.38 | 115.2 |

Polymers (16) to (23) were blended and mixed in the same manner as described in Example 1-(B) with a ring-opened polymer of 5-cyano-bicyclo[2,2,1]heptene-2 and PVC(1) described in Example 4 in the proportion shown in Table 5-2 below. The physical properties of the resulting compositions are shown in Table 5-2 below.

Table 5-2

| Run No. | Polymer Type | Polymer Amount (wt.%) | Amount of 5-Cyano-bicyclo-[2,2,1]-heptene-2 (wt.%) | Amount of PVC(1) (wt.%) | Izod Impact Strength (notched) (kg.cm/cm) | Transparency |
|---|---|---|---|---|---|---|
| 1 | (16) | 48.4 | 1.6 | 50 | 30.4 | Transparent |
| 2 | (17) | 36.6 | 13.4 | 50 | 45.3 | Transparent |
| 3 | (18) | 23.1 | 26.9 | 50 | 53.7 | Transparent |
| 4 | (19) | 16.9 | 33.1 | 50 | 79.3 | Transparent |
| 5 | (20) | 31.9 | 18.1 | 50 | 87.5 | Transparent |
| 6 | (21) | 17.9 | 32.1 | 50 | 25.4 | Substantially transparent |
| 7 | (22) | 10.1 | 39.9 | 50 | 11.6 | Opaque |
| 8 | (23) | 49.5 | 0.5 | 50 | 7.2 | Transparent |
| 9* | — | — | 45.5 | 50 | 5.4 | Opaque |

*Control: 4.5 wt.% of Solprene 411 was blended and mixed in place of the polymer.

In Run Nos. 1 to 9, the amount of Solprene 411 in the composition was controlled to 4.5 wt.%.

While the invention has been described in detail and with reference to specific embodiments thereof, it will be apparent to one skilled in the art that various changes and modifications can be made therein without departing from the spirit and scope thereof.

What is claimed is:

1. A resin composition having superior mechanical properties, including superior impact strength, without any substantial deterioration in tensile strength and hardness, said composition comprising
   (A) about 1 to about 95% by weight of a polymer obtained by ring-opening copolymerization of
      (1) about 99 to about 25 parts by weight of either (a) 5-cyano-bicyclo[2,2,1]heptene-2 or (b) a mixture of at least about 50 mole % of 5-cyano-bicyclo[2,2,1-]heptene-2 and at most 50 mole % of a cycloolefin compound with
      (2) about 1 to about 75 parts by weight of an unsaturated polymer having at least one carbon-carbon double bond per 1,000 carbons of said unsaturated polymer; and
   (B) about 99 to about 5% by weight of (1) a vinyl chloride homopolymer and/or (2) a copolymer containing at least about 50 mole % of vinyl chloride units.

2. The composition of claim 1, wherein the cycloolefin compound is selected from the group consisting of monocyclic monolefin compounds, non-conjugated cyclic polyene compounds and polycyclic olefin compounds.

3. The composition of claim 1, wherein the cycloolefin compound is a polycyclic olefin compound.

4. The composition of claim 1, wherein the proportion of the cycloolefin compound is not more than 30 mole %.

5. The composition of claim 1, wherein the unsaturated polymer is selected from the group consisting of butadiene rubbery polymers, chloroprene rubbers, isoprene rubbers, natural rubbers, ethylene/propylene/diene terpolymers, and cycloolefin rubbers.

6. The composition of claim 1, wherein the unsaturated polymer is a styrene/butadiene copolymer having a butadiene content of about 50 to about 95% by weight.

7. The composition of claim 1, wherein the proportion of the unsaturated polymer is 2.0 to 50% by weight.

8. The composition of claim 1, wherein the vinyl chloride homopolymer and copolymers have a degree of polymerization of about 450 to about 1500.

9. The composition of claim 1, wherein the proportion of Component (A) is about 5 to about 75% by weight, and the proportion of Component (B) is about 95 to about 25% by weight.

10. The composition of claim 5, wherein the unsaturated polymer has a Mooney viscosity of about 10 to about 200.

11. The composition of claim 5, wherein the unsaturated polymer is a homopolymer or copolymer of butadiene having a butadiene content of more than 50% by weight.

12. The composition of claim 1, wherein the unsaturated polymer is a graft copolymer of butadiene rubbery polymers, chloroprene rubbers, isoprene rubbers, natural rubbers, ethylene/propylene/diene terpolymers or cycloolefin rubbers with a monomer selected from the group consisting of styrene, acrylonitrile, methyl methacrylate and vinyl chloride.

13. The composition of claim 1, wherein the unsaturated polymer has at least 10 carbon-carbon double bonds per 1,000 carbons of said unsaturated polymer.

14. The composition of claim 12, wherein the butadiene rubbery polymer is selected from the group consisting of butadiene homopolymer rubber, a styrene/butadiene copolymer rubber and an acrylonitrile/butadiene copolymer rubber.

15. The composition of claim 1, wherein the unsaturated polymer is selected from the group consisting of butadiene rubbery polymers, chloroprene rubbers, isoprene rubbers, natural rubbers, ethylene/propylene/diene terpolymers and cycloolefin rubbers and has at least 10 carbon-carbon double bonds per 1,000 carbons of said unsaturated polymer.

16. The composition of claim 5, wherein the unsaturated polymer is a graft copolymer of butadiene rubbery polymers, chloroprene rubbers, isoprene rubbers, natural rubbers, ethylene/propylene/diene terpolymers or cycloolefin rubbers with a monomer selected from the group consisting of styrene, acrylonitrile, methyl methacrylate and vinyl chloride, and wherein said unsaturated polymer has a Mooney viscosity of about 10 to 200.

17. The composition of claim 16, wherein the unsaturated polymer has at least 10 carbon-carbon double bonds per 1,000 carbons of said unsaturated polymer.